Patented Sept. 16, 1930

1,775,869

UNITED STATES PATENT OFFICE

ERNST G. SANDMEIER, OF LOCARNO, SWITZERLAND, ASSIGNOR TO SWISS JEWEL CO. S. A., OF LOCARNO, SWITZERLAND

SYNTHETIC SPINEL COLORED LIKE A BRAZILIAN EMERALD

No Drawing. Application filed February 28, 1928, Serial No. 257,798, and in Switzerland January 19, 1928.

The present invention relates to synthetic spinels and has for its object to produce such spinels having the beautiful green color of Brazilian emeralds.

Green spinels have already been produced synthetically but it has not been possible heretofore to produce stones having the color of Brazilian emeralds. Such stones may be produced with the well known apparatus used in the manufacture of artificial rubies and sapphires described, for instance, in Patent No. 988,230, granted March 28, 1911, to A. V. L. Verneuil. The constituent materials for spinels according to this invention are aluminium, magnesium, cobalt, vanadium and manganese, preferably in oxid form. These materials are powdered, mixed and fed through an oxy-hydrogen flame onto a fire-clay column or support where they are fused and form the artificial stone by building up of successive layers of a curved shape.

The proportions of the powdered ingredients are for instance 100 grammes alumina, 20 grammes magnesium oxid, 0,005 grammes cobalt oxid, 0,05 grammes vanadium oxid and 1 gramme manganese oxid or substantially 82,6% alumina, 16,5% magnesium oxid, 0,004% cobalt oxid, 0,04% vanadium oxid and 0,83% manganese oxid.

For any other compounds of these metallic elements, the proportions of the ingredients could be easily calculated in order to maintain the required proportions stated in the above.

The physical properties of a synthetic spinel according to this invention are apart from its green coloring like that of the Brazilian emerald, the same as stated with reference to spinels in the above mentioned Verneuil patent.

The synthetic stones produced by the above method and apparatus have a hardness of 7—8, diamond being 10, and may be distinguished on the market from the natural stones by observing the following differences in their physical characteristics:—Cracks or scratches are often seen in natural stones under a high-power microscope, but they seem to be on the surface and resemble the parallel scratches made by a file on the edge of a glass plate. They are probably due to the cutting operation. In the synthetic stone, on the other hand, the cracks, when they occur, appear as genuine rifts beneath the surface, and are generally curved, due probably to the curved layers of which the stone is formed. The layers comprising the natural stone are flat and parallel, while those of the synthetic stone are curved, as above stated. The specks or cavity-like spots appearing in the natural stone are bounded by angular or crystal-shaped walls, while those occurring in the synthetic stone have curved or bubble-like walls. The above characteristics in nearly all cases must be looked for with a high-power microscope. When cut, however, the transparency and other optical properties of the natural and synthetic stones may be considered identical.

What I claim as new is:

1. A synthetic spinel having a green color closely resembling that of the natural Brazilian emerald, containing 100 grammes aluminium oxid, 20 grammes magnesium oxid, 0.005 gramme cobalt oxid, 0.05 gramme vanadium oxid, and 1 gramme manganese oxid.

2. A composition of matter adapted to produce synthetic green spinels closely resembling natural Brazilian emeralds, containing aluminium, magnesium, cobalt, vanadium and manganese in such proportions that when heated to a suitable temperature there will be produced a mass containing 82.6% aluminium, 16.5% magnesium oxid, 0.004% cobalt oxid, 0.04% vanadium oxid, and 0.83% manganese oxid.

In testimony whereof I affix my signature.

ERNST G. SANDMEIER.